Sept. 14, 1926.

W. C. SEYTER

BALANCE

Filed April 24, 1926

1,599,495

INVENTOR
William C. Seyter,
By Attorneys,
Fraser, Myers & Manley.

Patented Sept. 14, 1926.

1,599,495

UNITED STATES PATENT OFFICE.

WILLIAM C. SEYTER, OF JERSEY CITY HEIGHTS, NEW JERSEY, ASSIGNOR TO THE TORSION BALANCE COMPANY, OF NEW YORK, N. Y., A CORPORATION OF NEW YORK.

BALANCE.

Application filed April 24, 1926. Serial No. 104,294.

The present invention relates to analytical balances or the like, and more particularly to the rider rod construction in such devices, and aims to provide certain improvements therein.

In the manufacture of balances of the type wherein the rider on the beam is picked up or moved along the beam by a rider hook, which, in its limiting engaging position, is adapted to be guided parallel to the beam, it occasionally happens, in view of the difficulties encountered in manufacturing, that true parallelism between the rider rod at every point along the beam and the beam, is not realized. This condition, in practice, is remedied in accordance with the particular cause of the defect and at times requires the substitution of new parts and the scrapping of the defective parts.

According to the present invention, I provide means for guiding the rider hook when in its limiting position, parallel to the balance beam. I also provide means for positively insuring engagement of the rider by the rider hook and means for varying the limiting position of the engaging portion of the rider hook with respect to the balance beam so as to insure engagement of the rider by the rider hook. These various improvements I accomplish by providing the rider rod with a supplemental rod adapted to co-operate with an abutment for limiting the position of the engaging end of the rider hook with respect to the balance beam, said supplemental rod being adjustable to vary the degree of parallelism between it and the rider rod, whereby the supplemental rod will guide the rider hook parallel to the balance beam. The invention also contemplates other features of novelty which will be hereinafter more fully described.

In the accompanying drawings wherein I have shown two preferred embodiments of my invention, Figure 1 is a front elevation of an analytical balance embodying my invention.

Figure 1:
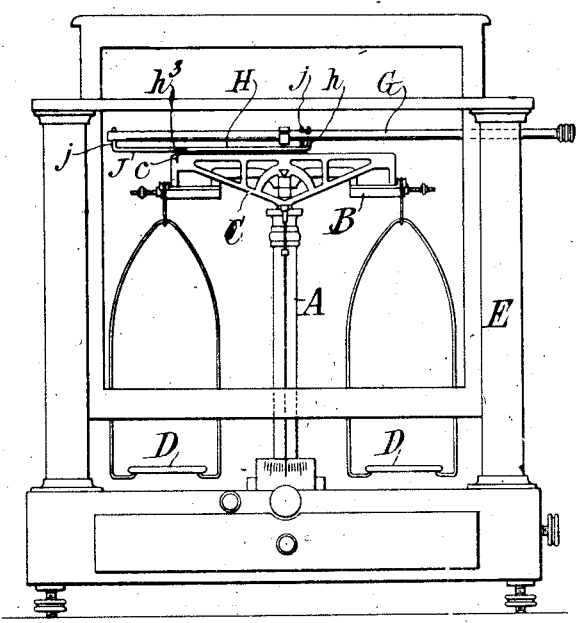

Referring first to Figure 1 of the drawings wherein I have shown my invention applied to a conventional form of analytical balance, let A indicate a column upon which is mounted a beam arrest B, and an equal arm balance beam C, from the ends of which are suspended the balance pans D, all mounted within an enclosing case E.

Extending through one wall of the enclosing case and supported by a rider rod carrier F mounted upon the column A is a slidable rider rod G fitted with a rider hook H and a supplemental guide rod J. This supplemental rod is adapted by engagement with the rider rod carrier to limit the position of the engaging end of the rider hook with respect to the balance beam, and to guide said rider hook end parallel to said beam. It is also adapted, through engagement with an abutment K mounted on the rider hook carrier, to limit the disengaging position of the rider hook.

The rider hook H comprises a part $h$ extending through and adjustable with respect to the rider rod G by a set screw $g$, a part $h'$ extending at substantially a right angle to the part $h$ and of substantially greater length than said part, and a hook end part $h^2$ extending at right angles to the part $h'$ adapted to ride over the top of the balance beam C. The hook end $h^2$ is fitted with a pin or hook $h^3$ extending parallel to the balance beam and adapted to engage the rider $c$ thereon. Preferably the rider hook H is made of thin metal bendable about the angle connecting the parts $h$ and $h'$, whereby the part $h'$ may be bent to extend truly parallel to both the plane of the top of the balance beam and the planes of the faces of said beam.

The supplemental rod J has its ends $j$ bent at right angles and adjustably mounted within openings in the rider rod G and adapted to be held in adjusted position by set screws $g'$. The ends $j$, it is to be understood, may extend into the openings in the rider rod to different degrees, thereby causing the rod J to extend out of true parallelism with the rider rod G. By this means the supplemental rod J, when in guiding position, may serve to correct any lack of parallelism due to manufacturing causes between the rider rod and the balance beam.

Figure 3:
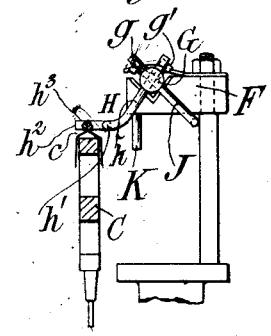
Fig. 3 is a transverse section taken on the line 3—3 of Fig. 2.
Figure 6:
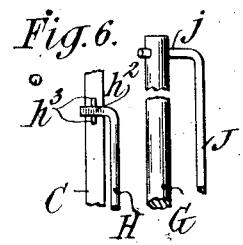
Fig. 6 is a fractional top plan view of Fig. 2 taken between the arrows 6—6.
Figure 2:
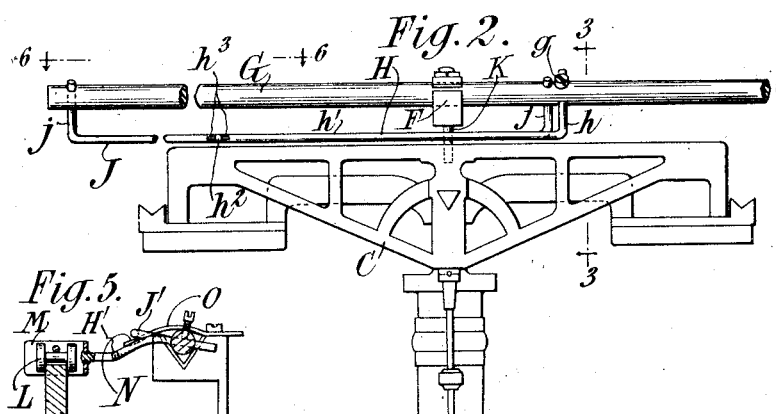
Fig. 2 is an elevation on an enlarged scale of the balance beam and rider rod construction of the balance shown in Figure 1, the enclosing case being omitted.
Figure 5:
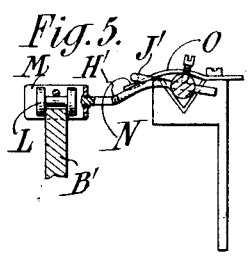
Fig. 5 is a transverse section taken on the line 5—5 of Fig. 4.
Figure 4:
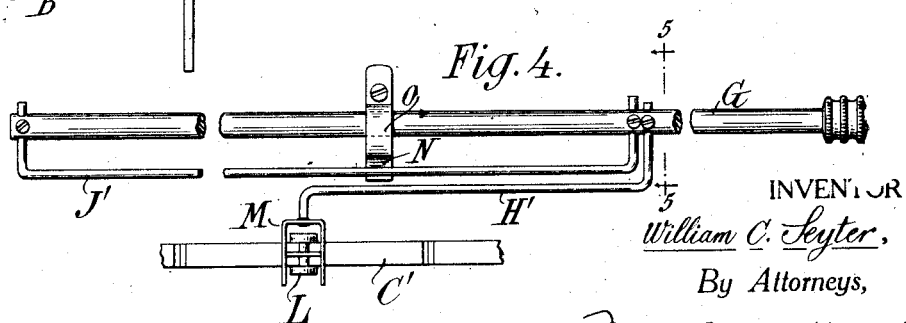
Fig. 4 is a top plan view of a modified form of rider rod construction.

In Figs. 4 and 5 I have shown the invention applied to a rider hook adapted to move a slide weight L along the balance beam B'. In this construction the rider hook end M consists of a substantially U-shaped frame, the arms of which have undercut grooves adapted to straddle the balance beam and engage over the slide weight L to move same over the balance beam. In other particulars the rider hook H' is similar to the rider H in Figs. 1 to 3. Likewise, the supplemental rod J' is adapted for adjustment with respect to the rider rod in the same manner as hereinbefore described in connection with the rod J. The guide abutment in Figs. 4 and 5, however, is somewhat different from that previously described, and consists of an inclined member N over which the rod J' is adapted to ride, it being apparent that if the ends of the rod J' are adjusted to different degrees on the rider rod, that as the supplemental rod moves over the inclined member the rider hook M will be caused to move out of true parallelism with respect to the rider rod. it being obvious that as the rod J' is moved over the incline N that it will ride up thereon or down thereover, depending upon the direction in which the rod is moved. If desired, the abutment N may be formed as a continuation of the clamping member O adapted to hold the rider rod against displacement from its groove in the rider rod carrier.

From the foregoing descriptions it will be apparent that if because of faulty manufacture or other cause, the rider rod and top edges of the balance beam are not in true parallelism whereby the rider hook will be certain to engage the rider at every point along the balance beam, that this defect may be readily remedied either by varying the adjustment of the supplemental slide rod, or by bending the long arm of the rider hook into true parallelism with the beam, or by adjustment of both said means. It will also be apparent that in view of the length of the rider hook part h' in Fig. 2, and the corresponding part of the rider H' in Fig. 4, the single rider hook will be adapted to engage the rider at any point along the balance beam.

While I have shown and described certain preferred embodiments of my invention, it will be understood that I do not wish to be limited to the exact structure disclosed, since modifications thereof may be resorted to without departing from the spirit of the invention.

What I claim is:

1. A balance or weighing scale comprising an enclosing case, a balance beam along which a rider is movable, a slidable rider rod, a rider hook carried thereby, and means for varying the limiting positions of the engaging end of the rider hook with respect to the balance beam.

2. A balance or weighing scale comprising an enclosing case, a balance beam along which a rider is movable, a slidable rider rod, a rider hook carried thereby, and means for limiting the position of the engaging end of the rider hook with respect to the balance beam and for insuring the movement of said rider hook end when in its limiting position, parallel to the balance beam.

3. A balance or weighing scale comprising an enclosing case, a balance beam along which a rider is movable, a slidable rider rod, a rider hook carried thereby, and means for varying the limiting positions of the engaging end of the rider hook with respect to the balance beam and for insuring the movement of said rider hook end when in its limiting position, parallel to the balance beam.

4. A balance or weighing scale comprising an enclosing case, a balance beam along which a rider is movable, a slidable rider rod, a rider hook carried thereby, and an adjustable rod carried by the rider rod for varying the limiting positions of the engaging end of the rider hook with respect to the balance beam.

5. A balance or weighing scale comprising an enclosing case, a balance beam along which a rider is movable, a slidable rider rod, a rider hook carried thereby, a supplemental rod carried by the rider rod co-operating with an abutment for limiting the position of the engaging end of the rider hook with respect to the balance beam, said supplemental rod being adjustable to vary the degree of parallelism between it and the rider rod, and said supplemental rod being adapted to guide said rider hook parallel to the balance beam.

6. A balance or weighing scale comprising an enclosing case, a balance beam along which a rider is movable and a slidable rider rod having a rider hook carried thereby, means for limiting the position of the engaging end of the rider hook with respect to the balance beam, said rider hook having a part thereof extending at an angle from the rider rod, and another part thereof of substantial length extending substantially parallel to the rider rod, said last-named part of the rider hook being adjustable to extend parallel to both the plane of the top of the balance beam and the planes of the faces of the balance beam.

7. A balance or weighing scale comprising an enclosing case, an equal arm balance beam along both arms of which a rider is movable, a slidable rider rod, a rider rod support mounted about midway the length of the balance beam, and a rider hook carried by the rider rod adapted to engage a rider at any point on the balance beam.

8. A balance or weighing scale comprising an enclosing case, an equal arm balance beam along both arms of which a rider is movable, a slidable rider rod, a rider rod support mounted about midway the length of the balance beam, and a rider hook carried by the rider rod having a part extending substantially parallel to the balance beam and of a length to engage a rider at any point on the balance beam.

In witness whereof, I have hereunto signed my name.

WILLIAM C. SEYTER.